(12) United States Patent
You et al.

(10) Patent No.: US 9,712,285 B2
(45) Date of Patent: Jul. 18, 2017

(54) METHOD AND DEVICE FOR SEARCHING FOR SERVICE FOR TERMINAL USING GAS PROTOCOL

(71) Applicant: LG ELECTRONICS INC., Seoul (KR)

(72) Inventors: Hyang Sun You, Anyang-si (KR); Yong Ho Seok, Anyang-si (KR); Ji Hyun Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 14/354,860

(22) PCT Filed: Nov. 19, 2012

(86) PCT No.: PCT/KR2012/009777
§ 371 (c)(1),
(2) Date: Apr. 28, 2014

(87) PCT Pub. No.: WO2013/073914
PCT Pub. Date: May 23, 2013

(65) Prior Publication Data
US 2014/0313936 A1    Oct. 23, 2014

Related U.S. Application Data

(60) Provisional application No. 61/561,264, filed on Nov. 18, 2011, provisional application No. 61/563,815, filed on Nov. 27, 2011.

(51) Int. Cl.
*H04L 1/16* (2006.01)
*H04L 29/08* (2006.01)
*H04W 48/14* (2009.01)
*H04W 84/12* (2009.01)

(52) U.S. Cl.
CPC ............ *H04L 1/1685* (2013.01); *H04L 67/16* (2013.01); *H04W 48/14* (2013.01); *H04W 84/12* (2013.01)

(58) Field of Classification Search
CPC ...... H04L 1/1685; H04L 67/16; H04W 48/14; H04W 84/12
See application file for complete search history.

(56) References Cited

U.S. PATENT DOCUMENTS

| | | | |
|---|---|---|---|
| 7,254,643 B1 * | 8/2007 | Peters, Jr. | ........... H04L 29/1216 709/227 |
| 2008/0151796 A1 | 6/2008 | Jokela | |
| 2009/0010399 A1 | 1/2009 | Kzm | |
| 2009/0274094 A1 | 11/2009 | Engwer | |
| 2011/0010246 A1 | 1/2011 | Kasslin | |

* cited by examiner

*Primary Examiner* — Walter Divito
(74) *Attorney, Agent, or Firm* — Lee Hong Degerman Kang Waimey

(57) ABSTRACT

Method and device for discovering a service are provided. A responding device receives a service request frame including a first service identifier indicating a service queried by the requesting device. The responding device transmits a service response frame to indicate that the queried service is currently not available and a service announce frame follows on. The responding device determines whether the queried service is accepted or not during a pre-defined time after transmitting the service response frame.

6 Claims, 12 Drawing Sheets

(A) Registered Service Query Protocol element format (B) Service Discovery Information format

METHOD AND DEVICE FOR SEARCHING FOR SERVICE FOR TERMINAL USING GAS PROTOCOL

CROSS-REFERENCE TO RELATED APPLICATIONS

This application is the National Stage filing under 35 U.S.C. 371 of International Application No. PCT/KR2012/009777, filed on Nov. 19, 2012, which claims the benefit of U.S. Provisional Application Ser. No. 61/561,264, filed on Nov. 18, 2011 and 61/563,815, filed on Nov. 27, 2011, the contents of which are all hereby incorporated by reference herein in their entirety.

BACKGROUND OF THE INVENTION

Field of the Invention

The present invention relates to wireless communication, and more particularly, to a service discovery method of a terminal.

Related Art

An institute of electrical and electronics engineers (IEEE) 802.11u task group (TG) serves to develop a standard for an interworking service with an external network through a 802.11 wireless local area network (WLAN). That is, the 802.11u proposes a protocol capable of informing in advance whether a specific external network service network can be connected through one given WLAN.

In the existing IEEE 802.11 standard, a variety of information is required in order for a station (STA) to perform an authentication procedure. The information may include network information for performing authentication, credential information of heterogeneous networks, and information indicating which protocol will be applied when an application currently being executed blocks another application or a TCP port.

However, in the IEEE 802.11u standard, a new protocol is proposed to perform a complex authentication procedure at a faster speed between heterogeneous networks.

In the protocol proposed in the IEEE 802.11u, a new network discovery and selection method may be performed in a media access control (MAC) layer. In the network discovery and selection method newly proposed in the IEEE 802.11u, a access point (AP) transmits a variety of information, that is, information on its network type (e.g., free, fee-based, or private network, etc.), roaming consortium information, place information, etc.) to a terminal before a station (STA) is associated with the AP, so that the STA acquires network-related information before the authentication.

For example, in the IEEE 802.11u, since information on a service which can be provided by an AP to an STA is provided to the STA in advance through a generic advertisement service (GAS) protocol before the STA is connected to a network, information on the network can be acquired before the STA and the AP are associated.

SUMMARY OF THE INVENTION

The present invention provides a service discovery method of a terminal using a generic advertisement service (GAS) protocol.

The present invention also provides an apparatus for performing a service discovery method of a terminal using a GAS protocol.

In an aspect to achieve the object of the present invention, a service discovery method includes transmitting a first generic advertisement service (GAS) initial request frame including a service discovery information field to an access point (AP), and if a response is not received from the AP during a given time after the GAS initial request frame is transmitted, transmitting a second GAS initial request frame including a service discovery for future service information field to the AP. The service discovery information field includes a field for indicating a service identification for indicating a requested service, and the service discovery for future service information field includes a field for indicating the service identification, a field for indicating a wakeup interval, and a field for indicating a service query timeout. The method may further include after transmitting the second GAS initial request frame, receiving an acknowledgement (ACK) frame transmitted from the AP or a first GAS initial response frame including the service discovery for future service information field. The service discovery for future service information field may include a field for indicating the service identification, a field for indicating the wakeup interval, and a field for indicating the service query timeout. The method may further include if the service query timeout is not elapsed after receiving the ACK frame or the first GAS initial response frame, receiving a second GAS initial response frame including a service discovery information field transmitted from the AP in a wakeup mode by operating in a power saving mode on the basis of the wakeup interval. The service discovery field may include a field indicating the service identification requested by the terminal, a field indicating an address of a service provider which provides the service, and a field indicating load information of the service provider. The service discovery for future service information field may be a field transmitted by being included in a query response field of the first GAS initial response frame, and the service discovery information field may be a field transmitted by being included in a query response field of the second GAS initial response frame. The method may further include receiving support information of a registered service query protocol of the AP through an advertisement protocol information element included in a probe response frame or a beacon frame transmitted from the AP. The service discovery information field may be a field transmitted by being included in a query request field of the first GAS initial request frame, and the service discovery for future service information field may be a field transmitted by being included in a query request field of the second GAS initial request frame.

In an aspect to achieve the object of the present invention, a device for performing a service discovery includes a processor configured for transmitting a first generic advertisement service (GAS) initial request frame including a service discovery information field to an access point (AP), and if a response is not received from the AP during a given time after the GAS initial request frame is transmitted, transmitting a second GAS initial request frame including a service discovery for future service information field to the AP. The service discovery information field includes a field for indicating a service identification for indicating a requested service, and the service discovery for future service information field includes a field for indicating the service identification, a field for indicating a wakeup interval, and a field for indicating a service query timeout. The processor may be configured for, after transmitting the second GAS initial request frame, receiving an acknowledgement (ACK) frame transmitted from the AP or a first GAS initial response frame including the service discovery for future service information field. The service discovery for future service information field may include a field for indicating the service identification, a field for indicating the wakeup interval, and a field for indicating the service query timeout.

The processor may be configured for, if the service query timeout is not elapsed after receiving the ACK frame or the first GAS initial response frame, receiving a second GAS initial response frame including a service discovery information field transmitted from the AP in a wakeup mode by operating in a power saving mode on the basis of the wakeup interval. The service discovery field may include a field indicating the service identification requested by the terminal, a field indicating an address of a service provider which provides the service, and a field indicating load information of the service provider. The service discovery for future service information field may be a field transmitted by being included in a query response field of the first GAS initial response frame, and the service discovery information field may be a field transmitted by being included in a query response field of the second GAS initial response frame. The processor may be configured for receiving support information of a registered service query protocol of the AP through an advertisement protocol information element included in a probe response frame or a beacon frame transmitted from the AP. The service discovery information field may be a field transmitted by being included in a query request field of the first GAS initial request frame, and the service discovery for future service information field may be a field transmitted by being included in a query request field of the second GAS initial request frame.

A service discovery method using a generic advertisement service (GAS) protocol is provided in such a manner that, a station (STA) queries information on a service before the STA is associated with an access point (AP) and the AP responds as to whether the queried service can be provided. Therefore, it is possible for the STA to quickly discovery a desired service and thereafter access the network, thereby being able to receive the desired service. In addition, if a service desired by the STA is registered in the AP at a later time, the AP transmits to the STA a fact that the service is registered so that the STA can use the desired service.

BRIEF DESCRIPTION OF THE DRAWINGS

The present invention provides a method of effectively discovering a service registered in an access point (AP) by a station (STA). A service discovery procedure of the STA is preferably performed at a fast speed and with a small power consumption. A service provided by the AP may be an application (e.g., File Transfer Protocol (FTP), Voice over Internet Protocol (VoIP), etc.) provided by various communication objects on the network, and may imply contents such as a specific file or may imply a device itself.

For convenience, it is assumed hereinafter that an AP connected to a service provider takes a role of delivering a service query transmitted from a terminal. However, such a role may also be performed by an STA, not by the AP, and such an embodiment is also included in the scope of the present invention.

In case of an infrastructure basis service set (BSS), an STA may acquire information on a service registered in an AP by querying about which service exists via the AP. In this case, the service must be registered in the AP (or registered server). In case of an independent basic service set (IBSS) not having an AP, an STA may scan a wireless channel to acquire information on a service that can be provided. Information on the service may be periodically transmitted by a service provider to the STA.

Hereinafter, a method in which an STA discovers a service that can be provided from an AP will be described.

Figure 1:
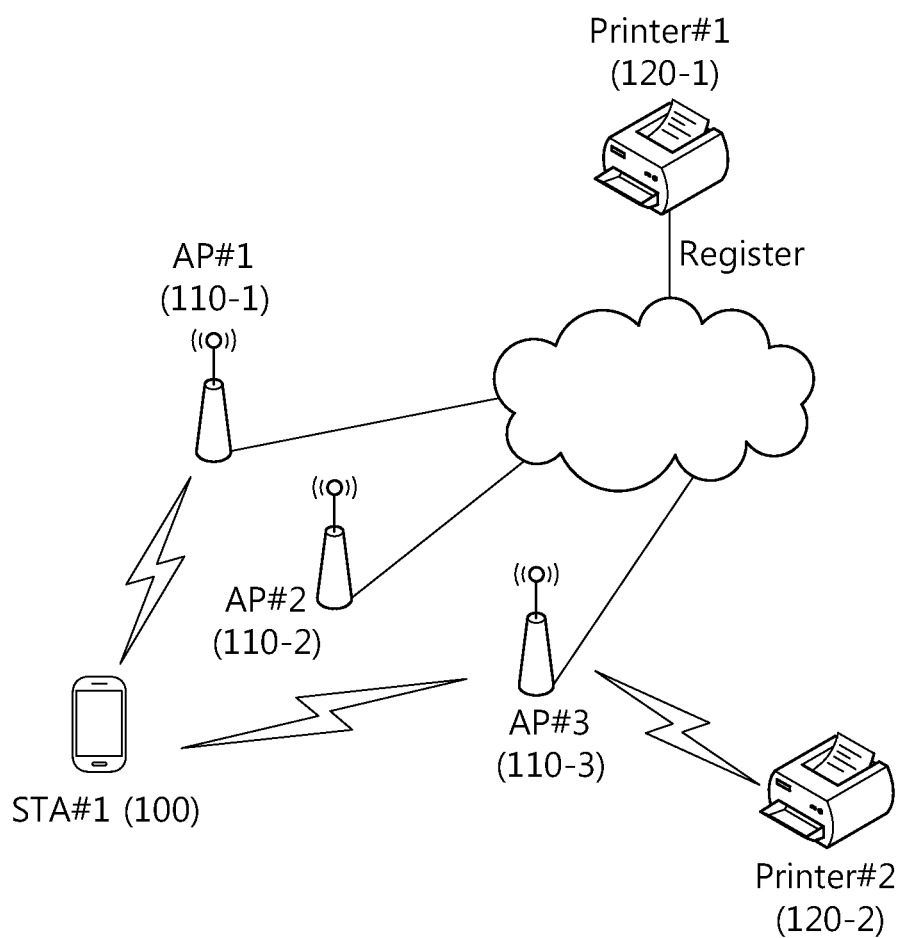
FIG. 1 shows the concept of a service discovery method of a terminal according to an embodiment of the present invention.

FIG. 1 shows the concept of a service discovery method of a terminal according to an embodiment of the present invention.

In the method of FIG. 1, an STA discovers information on a service that can be provided by an STA by assuming an infrastructure BSS including at least one AP.

Referring to FIG. 1, the infrastructure BSS may include an STA 100, APs 110-1, 110-2, and 110-3, and service providers 120-1 and 120-2. It is assumed in the description that the service providers 120-1 and 120-2 are printers.

The service providers 120-1 and 120-2 may be connected via a backhaul network (in case of the first service provider 120-1) or may be connected via the AP 110-3 (in case of the second service provider 120-2). The service providers 120-1 and 120-2 may be registered in the AP 120-2. The STA 100 can know which service will be provided via the APs 110-1, 110-2, and 110-3 on the basis of information of a service provider registered in the APs 110-1, 110-2, and 110-3.

For example, it may be assumed a case where the service providers 120-1 and 120-2 are registered in the first AP 110-1 and the third AP 110-3. The STA 100 may discover information on the service providers 120-1 and 120-2 via the first AP 110-1 and the third AP 110-3. A procedure of discovering a service of the service providers 120-1 and 120-2 by the STA 100 may be performed as follows. It is assumed a case where the STA 100 discovers the service via the first AP 110-1.

(1) Whether a service desired by the STA 100 can be provided is queried to the first AP 110-1.

(2) If the service desired by the STA 100 is registered in the first AP 110-1, the first AP 110-1 provides the STA 100 with information of a registered service provider and service related information such as a service type.

(3) If the service is to be provided to the STA 100 on the basis of the provided service provider's information and the service related information such as the service type, an association with the service provider 120-1 may be requested and then the service may be provided.

A method for discovering a service registered in an AP by an STA and for acquiring service related information (or service discovery result) by using a GAS protocol is provided according to an embodiment of the present invention. By using the GAS protocol, the STA can acquire, in advance, information on a network connected to the AP before a link is set up between the STA and the AP. Hereinafter, a method of associating the STA and the AP by using the GAS protocol will be described with reference to FIG. 2.

Figure 2:
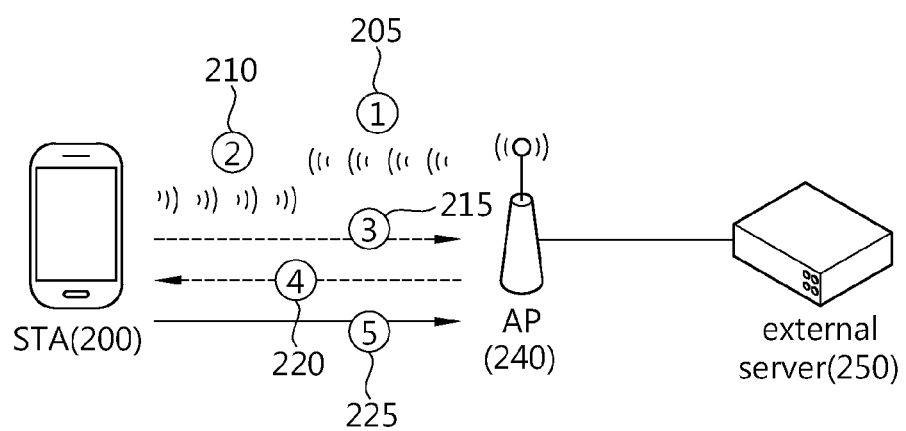
FIG. 2 shows the concept of a method of associating a station (STA) and an access point (AP) by using a generic advertisement service (GAS) protocol according to an embodiment of the present invention.

FIG. 2 shows the concept of a method of associating an STA and an AP by using a GAS protocol according to an embodiment of the present invention.

(1) Referring to FIG. 2, when an STA 200 performs passive scanning, a beacon frame 205 may be transmitted from an AP 240 to the STA 200. The beacon frame 205 may include an advertising protocol information element. The advertising protocol information element may include information indicating that the AP 240 supports a registered service query protocol (RSQP) as a service discovery protocol. That is, supportable service discovery protocol information may be announced to the STA 200 through the advertising protocol information element. The advertising protocol information element (i.e., RSQP) will be additionally described hereinafter.

(1)-1 If the STA 200 performs active scanning, the AP 240 may transmit a probe response frame in response to a probe request frame 210 transmitted from the STA 200. Similarly to the beacon frame, the advertising protocol information element is also included in the probe response frame transmitted from the AP 240, and thus it can be announced to the STA 200 that the AP 240 supports the RSQP.

(2) The STA 200 may transmit a GAS initial request frame 215, and thus may transmit information on a service requested by the STA 200 to the AP 240.

The GAS initial request frame 215 will be additionally described hereinafter according to an embodiment of the present invention.

(3) The AP 240 transmits information requested by the STA 200 through the GAS initial response frame 220.

The AP 240 may transmit a GAS initial response frame 220 in response to the GAs initial request frame 215 transmitted from the STA 200. If the service requested by the STA 200 is registered in the AP 240, information indicating the service discovery to the STA 200 may be transmitted to the STA 200 through the GAS initial response frame 220. The AP 240 may transmit a service discovery result to the STA 200 on the basis of information included therein or by querying it to a server 250 of an external network.

The GAS initial response frame 220 will be additionally described hereinafter according to an embodiment of the present invention.

(4) If the STA 200 intends to receive a service on the basis of information included in the received GAS initial response frame 220, an authentication and association procedure 225 is performed with respect to a specific service provider and thereafter the service is received.

An RSQP as a protocol for discovering a service in a terminal and a frame used in a registered service query protocol will be described hereinafter according to an embodiment of the present invention.

Figure 3:
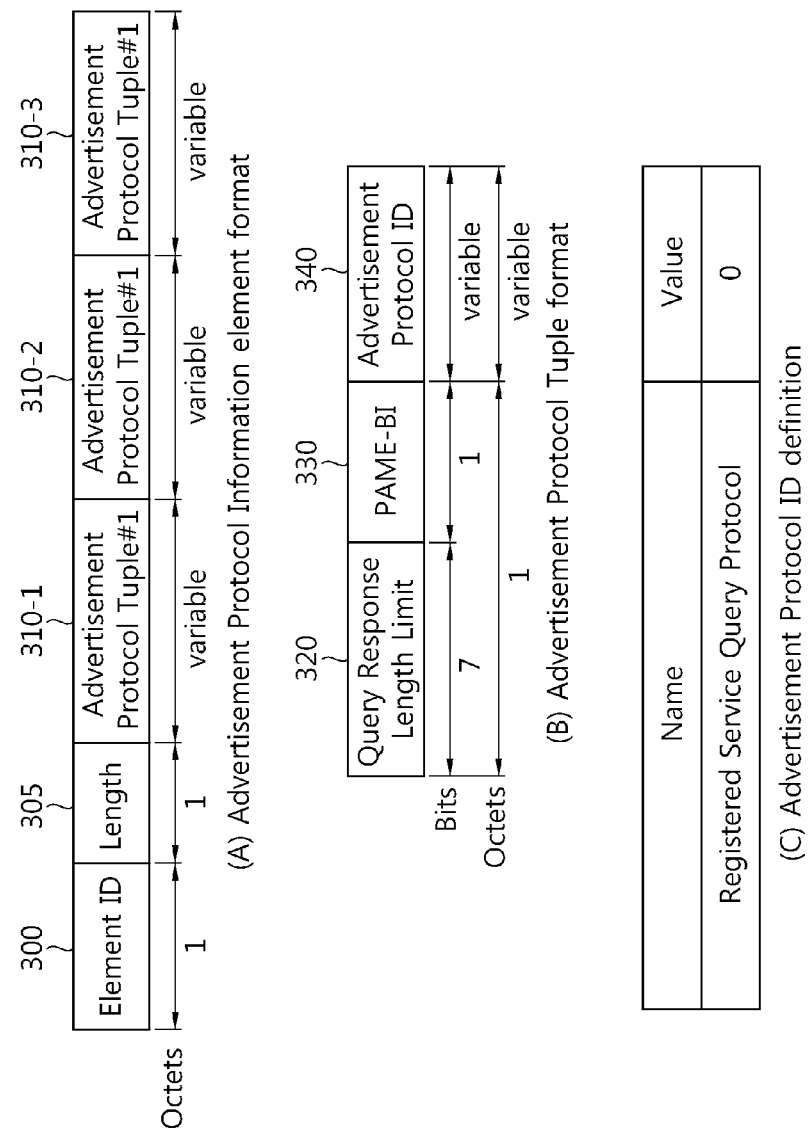
FIG. 3 shows the concept of an advertisement protocol information element format according to an embodiment of the present invention.

FIG. 3 shows the concept of an advertisement protocol information element format according to an embodiment of the present invention.

An advertisement protocol information element may be used to transmit information on a protocol that can be provided in a GAS protocol. The advertisement protocol information element may be transmitted by being included as an information element in a framebody of a beacon frame, a probe response frame, a GAS initial request frame, and a GAS initial response frame.

FIG. 3A shows the concept of an advertisement protocol information element format according to an embodiment of the present invention.

Referring to FIG. 3A, the advertisement protocol information element format may include an element ID 300, a length 305, and a plurality of advertisement protocol tuples 310-1, 310-2, and 310-3.

(1) The element ID 300 may be used as an indicator for indicating what is indicated by the information transmitted by being included in the framebody. It may be indicated that the information transmitted through the element ID 300 is an advertisement protocol information element.

(2) The length 305 may include information on a length (or the number of bits) assigned to the advertisement protocol tuples 310-1, 310-2, and 310-3.

(3) The advertisement protocol tuples 310-1, 310-2, and 310-3 may include a query response length limit 320, a PAME-BI 330, and an advertisement protocol ID 340.

FIG. 3B shows the concept of a field included in the advertisement protocol tuple 310-1.

(1) The query response length limit 320 may include information on the maximum number of bits that can be included in a query response included in a GAS initial response frame to be transmitted by an AP.

(2) The PAME-BI (pre-association message exchange BSSID independent) 330 indicates whether an advertisement service transmits a query response which is independent of a BSSID (basic service set identification) used for GAS frame exchange. For example, if the PAME-BI is 1, it may indicate that the query response transmitted from an advertisement server is independent of the BSSID, and if the PAME-BI is 0, it may indicate that the query response transmitted from the advertisement server is dependent on the BSSID.

(3) The advertisement protocol ID 340 may include a value indicating an advertisement protocol that can be supported by the STA (or AP). For example, as shown in FIG. 3C, if the transmitted advertisement protocol ID is 0, it may announce that the AP and the STA support a registered service query protocol. A mapping relation between a protocol supported by the advertisement protocol ID 340 and a value mapped to the protocol is an arbitrary mapping relation.

The registered service query protocol according to the embodiment of the present invention may be used as a protocol for providing information on whether an AP can provide a specific service if an STA requests the specific service to the AP. In the registered service query protocol, if a service discovery is requested to the AP from the STA through the GAS initial request frame, the AP may proxy a query to an external server or may use a local information of the AP to transmit registered service information to the STA through the GAS initial response frame.

Figure 4:
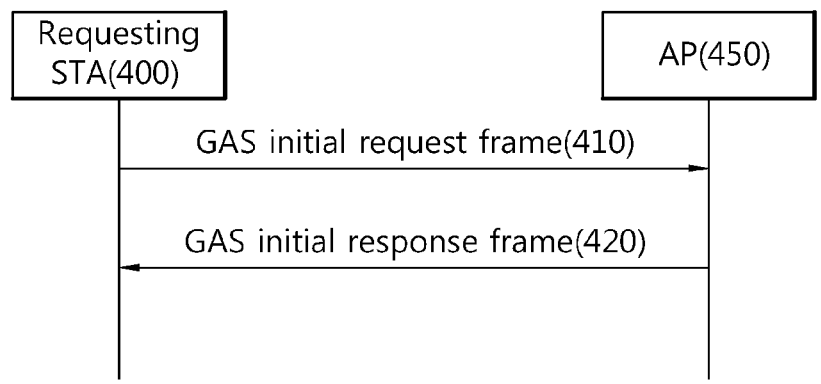
FIG. 4 shows the concept of a service discovery method according to an embodiment of the present invention.

FIG. 4 shows the concept of a service discovery method according to an embodiment of the present invention.

The procedure of FIG. 4 is a procedure to be performed after transmitting from an AP 450 to an STA 400 a beacon frame in case of passive scanning or a probe response frame in case of active scanning, and transmitting information indicating that the AP 450 supports a registered service query protocol to the STA 400.

Referring to FIG. 4, the STA 400 transmits a GAS initial request frame 410 to the AP 450.

The STA 400 may transmit, to the AP 450, service information requested through the GAS initial request frame 410.

Table 1 below shows an information element included in a framebody of the GAS initial request frame 410.

TABLE 1

| order | information |
|---|---|
| 1 | Category |
| 2 | Action |
| 3 | Dialog Token |
| 4 | Advertisement Protocol Element |
| 5 | Query Request Length |
| 6 | Query Request |

Referring to Table 1, the information element included in the framebody of the GAS initial request frame 410 may include a category, an action, a dialog token, an advertisement protocol element, a query request length, and a query request. The information included in Table 1 is one example, and a part of the information may be added or deleted as long as it does not depart from the spirit of the present invention.

(1) The category may include frame category information of the GAS initial request frame 410. For example, the GAS initial request frame 410 may be included in a public action frame of the frame category.

(2) The action may be used to specify the GAS initial request frame 410 of the public action frame.

(3) The dialog token may be used to match with an action response when a plurality of action requests are present.

(4) As described above, the advertisement protocol element may include information on an advertisement protocol which is desired to be configured with the AP 450 by the STA 400. According to the embodiment of the present invention, the advertisement protocol element of the GAS initial request frame 410 transmitted by the STA 400 may include a value for indicating the aforementioned registered service query protocol. That is, the STA 400 may transmit to the AP 450 the GAS initial request frame 410 in which an advertisement protocol ID included in an advertisement protocol tuple included in the advertisement protocol element has a value of 0.

(5) The query request length may include length information (or information on the number of bits) assigned to the query request.

(6) The query request may include information on a service requested by the STA 400 through the GAS initial request frame 410. Hereinafter, information included in the query request will be described with reference to FIG. 5.

Figure 5:
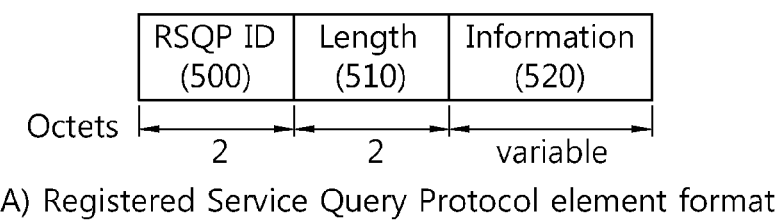
FIG. 5 shows the concept of a query request of a GAS initial request frame according to an embodiment of the present invention.
Figure 5:
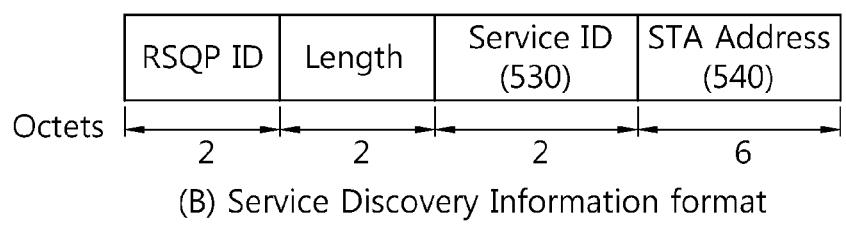

FIG. 5 shows the concept of a query request of a GAS initial request frame according to an embodiment of the present invention.

FIG. 5A shows a typical field format of the query request. For example, the query request may include an RSQP ID 500, a length 510, and an information 520.

(1) The RSQP ID 500 may be an indicator for a type of the information 520.

(2) The length 510 may include information indicating the number of bits assigned to the information 520.

(3) The information 520 may include information transmitted and received according to the RSQP ID 500.

For example, the query request may include information on a service requested by the STA 400. The information on the service requested by the STA 400 may be transmitted by being included in the query request as a service discovery information field of FIG. 5B. The service discovery information field of FIG. 5B is a field used by the STA 400 to request service related information to the AP 450, and if used for the same purpose, sub-fields included in the service discovery information field described below may be added or deleted, and such an embodiment may also be included in the scope of the present invention.

Referring to FIG. 5B, a service ID 530 and an STA address 540 may be included in the service discovery information field for transmitting the information on the service requested by the STA 400.

(1) The service ID 530 may include information for indicating a service queried by the STA 400.

(2) The STA address 540 may include information on a media access control (MAC) address of the STA 400 which transmits the GAS initial request frame 410.

Referring back to FIG. 4, the GAS initial response frame 420 is transmitted from the AP 450 to the STA 400.

The GAS initial response frame 420 may be transmitted from the AP 450 to the STA 400 in response to the GAS initial request frame 410 transmitted from the STA 400.

Table 2 below shows an information element included in the framebody of the GAS initial response frame 420.

TABLE 2

| order | information |
|---|---|
| 1 | Category |
| 2 | Action |
| 3 | Dialog Token |
| 4 | Status Code |
| 5 | GAS Comeback Delay |
| 6 | Advertisement Protocol Element |
| 7 | Query Response Length |
| 8 | Query Response |

Referring to Table 2, a status code and a GAS comeback delay may be additionally included in the element included in the aforementioned GAS initial request frame 410 of Table 1. The information included in Table 2 is one example, and a part of the information may be added or deleted as long as it does not depart from the spirit of the present invention.

(1) The category may include frame category information of the GAS initial response frame 420. For example, the GAS initial response frame 420 may be included in the public action frame.

(2) The action may be used as an indicator for specifying the GAS initial response frame 420 of the public action frame.

(3) The dialog token is information used to match a plurality of action requests and action responses. It may be used by copying the dialog token of the GAS initial request frame 410.

(4) The status code may include information indicating a success/failure of a response of a request from the GAS initial request frame 410.

(5) The GAS comeback delay may include information related to a delay time for receiving a GAS comeback request frame from the STA 400 after the GAS initial response frame 420 is transmitted from the AP 450.

(6) The advertisement protocol element may include information on an advertisement protocol which is desired to be configured with the AP 450 by the STA 400. According to the embodiment of the present invention, the advertisement protocol element of the GAS initial request frame 410 transmitted by the STA 400 may include a value corresponding to an RSQP. The same value may also be included in the advertisement protocol element transmitted by the AP 450 when transmitted.

The query response length may include length information assigned to the query response.

The query response may include information on a result of discovering by the AP 450 a service requested by the STA 400 through the GAS initial request frame 410. Hereinafter, a query response will be additionally described with reference to FIG. 6.

Figure 6:
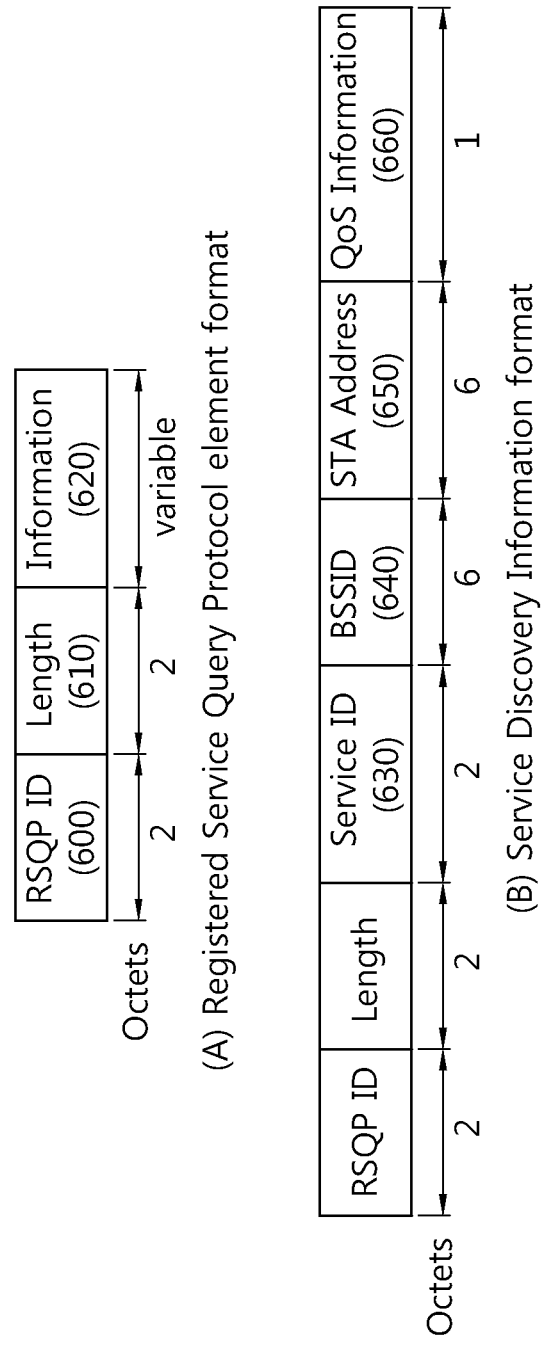
FIG. 6 shows the concept of a query response according to an embodiment of the present invention.

FIG. 6 shows the concept of a query response according to an embodiment of the present invention.

FIG. 6A shows a typical field format of the query response. For example, the query response may include an RSQP ID 600, a length 610, and an information 620. Descriptions on the respective fields are the same as those of FIG. 5A.

The query response may transmit information regarding a result of discovering a service requested by an STA 400 through a service discovery information field of FIG. 6B.

Referring to FIG. 6B, the service discovery information field may include a service ID 630, a BSSID 640, an STA address 650, and a QoS information 660. The service discovery information field of FIG. 6B is a field used by the AP 450 to request service related information to the STA 400, and if used for the same purpose, sub-fields included in the service discovery information field described below may be added or deleted, and such an embodiment may also be included in the scope of the present invention.

(1) The service ID 630 may include an indicator for a service queried by the STA 400.

(2) The BSSID 640 may include BSSID information of the AP 450 which transmits the GAS initial response frame 420.

(3) The STA address 650 may include information on a MAC address of an STA (or a service provider) which provides a service corresponding to the service ID 630.

(4) The QoS information 660 may include load information (or expected throughput, queue information) of the STA (or the service provider) which provides the service corresponding to the service ID 630.

The AP 450 which receives the GAS initial request frame from the STA 400 may transmit the GAS initial response frame 420 if a service requested by the STA 400 is registered in the AP 450. However, if the service requested by the STA 400 is not registered in the AP 450, the response frame may not be transmitted to the STA 400. If the STA 400 waits for the GAS initial response frame 420 from the AP 450 during a specific timeout duration and if no response is received from the AP 450 during the specific timeout duration, a requested RSQP may be suspended.

According to another embodiment of the present invention, in a case where a service queried by the STA through the GAS initial request frame is not registered in the AP, if the service queried by the STA is registered at a later time in the AP, information indicating that the queried service is registered in the AP may be transmitted to the STA.

Figure 7:
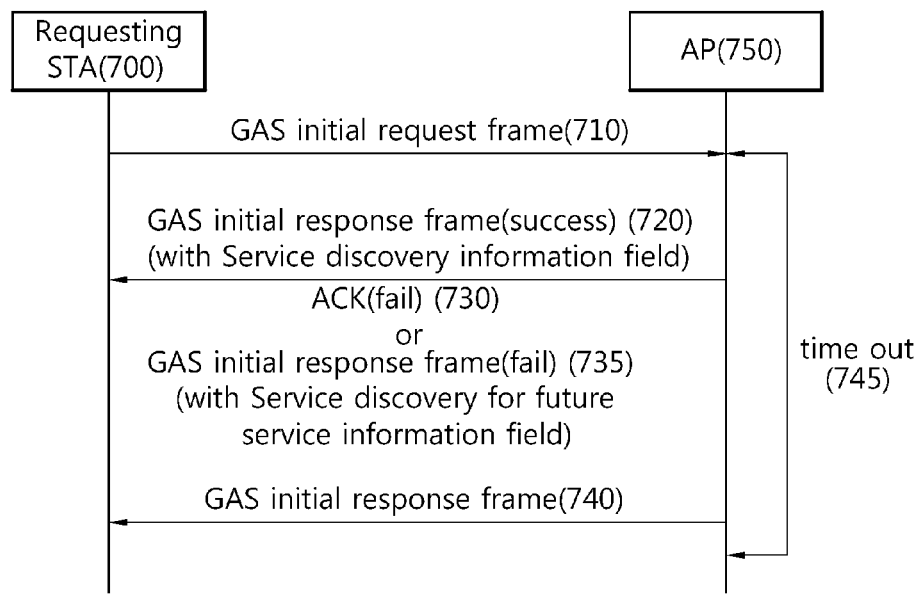
FIG. 7 shows the concept of a service discovery method of an STA according to an embodiment of the present invention.

FIG. 7 shows the concept of a service discovery method of an STA according to an embodiment of the present invention.

The procedure of FIG. 7 is a procedure to be performed after transmitting from an AP 750 to an STA 700 a beacon frame or a probe response frame, and transmitting information indicating that the AP 750 supports a registered service query protocol to the STA 700.

It is assumed in FIG. 7 that a service queried by the STA 700 through a GAS initial request frame 710 is not registered in the AP 750. It is provided a method of transmitting to the STA 700 the information indicating that the service queried by the STA 700 is registered in the AP 750, when the service queried by the STA 700 is registered in the AP 750 at a later time.

Referring to FIG. 7, the GAS initial request frame 710 is transmitted from the STA 700 to the AP 750.

Referring to Table 1 above, a field included in the query request may be newly defined in an information element included in a framebody of the GAS initial request frame 710 transmitted from the STA 700.

Figure 8:
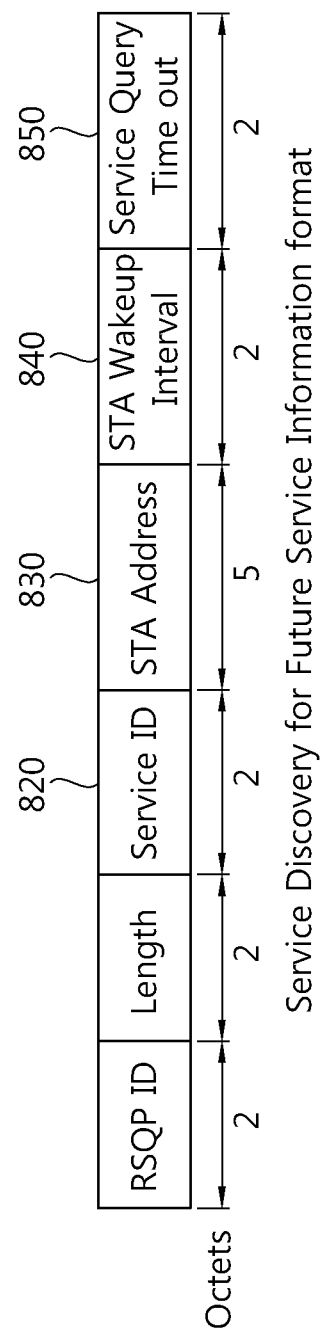
FIG. 8 shows the concept of a field included in a query request according to an embodiment of the present invention.

FIG. 8 shows the concept of a field included in a query request according to an embodiment of the present invention.

Referring to FIG. 8, the query request may include a service discovery for future service information field.

The service discovery for future service information field may include a service ID 820, an STA address 830, an STA wakeup interval 840, and a service query timeout 850. The service discovery for future information field of FIG. 8 is a field to be transmitted by including wakeup information and timeout information of a terminal to request service related information from the STA 700 to the AP 750. If used for the same purpose, sub-fields included in the service discovery for future information field described below may be added or deleted, and such an embodiment may also be included in the scope of the present invention.

(1) The service ID 820 may include information on a service queried by the STA 700 through a query request included in the GAS initial request frame 710.

(2) The STA address 830 may include information on a MAC address of the STA 700 which transmits the GAS initial request frame 710.

(3) The STA wakeup interval 840 may include information on a wakeup interval for energy saving of a terminal which transmits the GAS initial request frame 710. The terminal may operate in a power saving mode on the basis of the STA wakeup interval.

(4) The service query timeout 850 may include information on a time required to maintain a protocol for receiving service related information from the AP 750 after the STA 700 transmits the GAS initial request frame 710.

Referring back to FIG. 7, the AP 750 transmits to the STA 700 a GAS initial response frame 720 or an ACK frame 730.

If the service requested by the STA 700 is registered in the AP 750, the GAS initial response frame 720 may be transmitted to the STA 700. The query response of the GAS initial response frame 720 may include a service discovery information field similarly to FIG. 6B.

If the service requested by the STA 700 is not registered in the AP 750, the ACK frame 730 or a newly defined GAS initial response frame 735 may be transmitted in response to the GAS initial request frame 710 transmitted from the STA 700.

The newly defined GAS initial response frame 735 transmitted from the AP 750 may include information indicating that the service requested by the STA 700 is not currently registered in the AP 750, but when the service requested by the STA 700 is registered within a service query timeout 745 of the STA, a fact that the service is registered will be announced to the STA 700.

Such information may be included in a query response of the GAS initial response frame 735.

Figure 9:
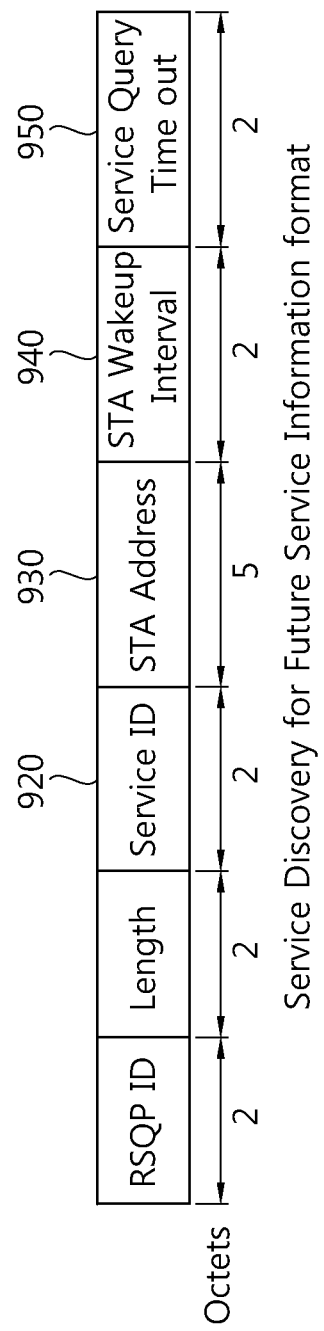
FIG. 9 shows the concept of a query response included in a GAS initial response frame 735 of FIG. 7 according to an embodiment of the present invention.

FIG. 9 shows the concept of a query response included in the GAS initial response frame 735 according to an embodiment of the present invention.

Referring to FIG. 9, a service discovery for future information field included in the query response may include a service ID 920, an STA address 930, an STA wakeup interval 940, and a service query timeout 950. The service discovery for future information field of FIG. 9 is a field to be transmitted by including information indicating that, when a service requested by the STA 700 is registered within the service query timeout 745 of the STA 700, a fact that the service is registered will be announced to the STA 700. If used for the same purpose, sub-fields included in the service discovery for future information field described below may be added or deleted, and such an embodiment may also be included in the scope of the present invention.

The service ID 920 may include information on a service ID requested by the STA 700 which transmits the GAS initial request frame 710.

The STA address 930 may include information on a MAC address of the STA 700 which provides a service requested by a terminal.

The STA wakeup interval 940 may include information on a wakeup interval for energy saving of the STA 700 which transmits the GAS initial request frame 710.

The service query timeout 950 may include service request valid time information of the STA 710 which transmits the GAS initial request frame 710.

Referring back to FIG. 7, if the service requested by the STA 700 is registered in the service timeout query, the AP 750 transmits to the STA 700 a GAS initial response frame 740 or a service registration announcement frame.

Figure 10:
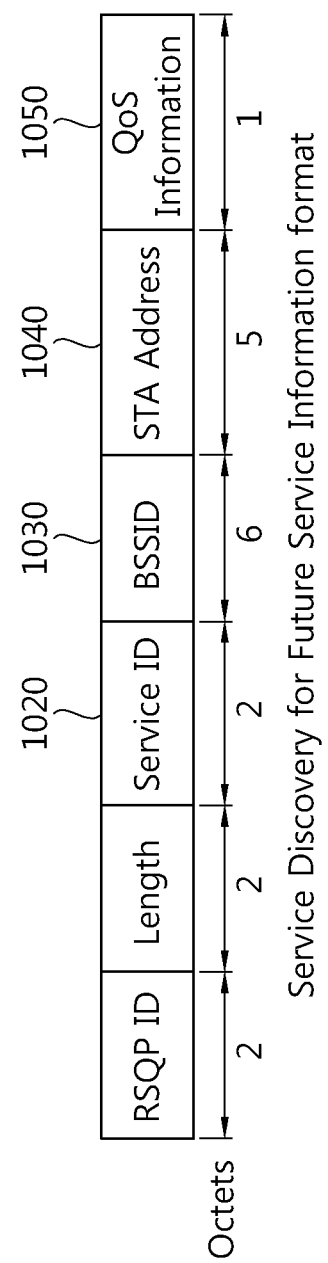
FIG. 10 shows the concept of a query response included in a GAS initial response frame according to an embodiment of the present invention.

FIG. 10 shows the concept of a query response included in a GAS initial response frame according to an embodiment of the present invention.

Referring to FIG. 10, a service discovery information field included in the query response may include a service ID 1020, a BSSID 1030, an STA address 1040, and a QoS information 1050. The service discovery information field of FIG. 10 is a field used by the AP to request service related information to the STA, and if used for the same purpose, sub-fields included in the service discovery information field described below may be added or deleted, and such an embodiment may also be included in the scope of the present invention.

(1) The service ID 1020 may include ID information of a service requested by the STA 700 which transmits the GAS initial request frame 710.

(2) The BSSID 1030 may include BSSID information of the AP 750 which transmits the GAS initial response frame 740.

(3) The STA address 1040 may include MAC address information of an STA (or service provider) which provides a service corresponding to the service ID 1020.

(4) The QoS information 1050 may include load information (e.g., expected throughput, queue information) of the STA (or service provider) which provides the service corresponding to the service ID 1020.

Such information may be transmitted not through the GAS initial response frame but through a newly defined service registration announcement frame. That is, the service registration announcement frame may also include the service ID 1020, the STA address 1040, the BSSID 1030, and the QoS information 1050.

Figure 11:
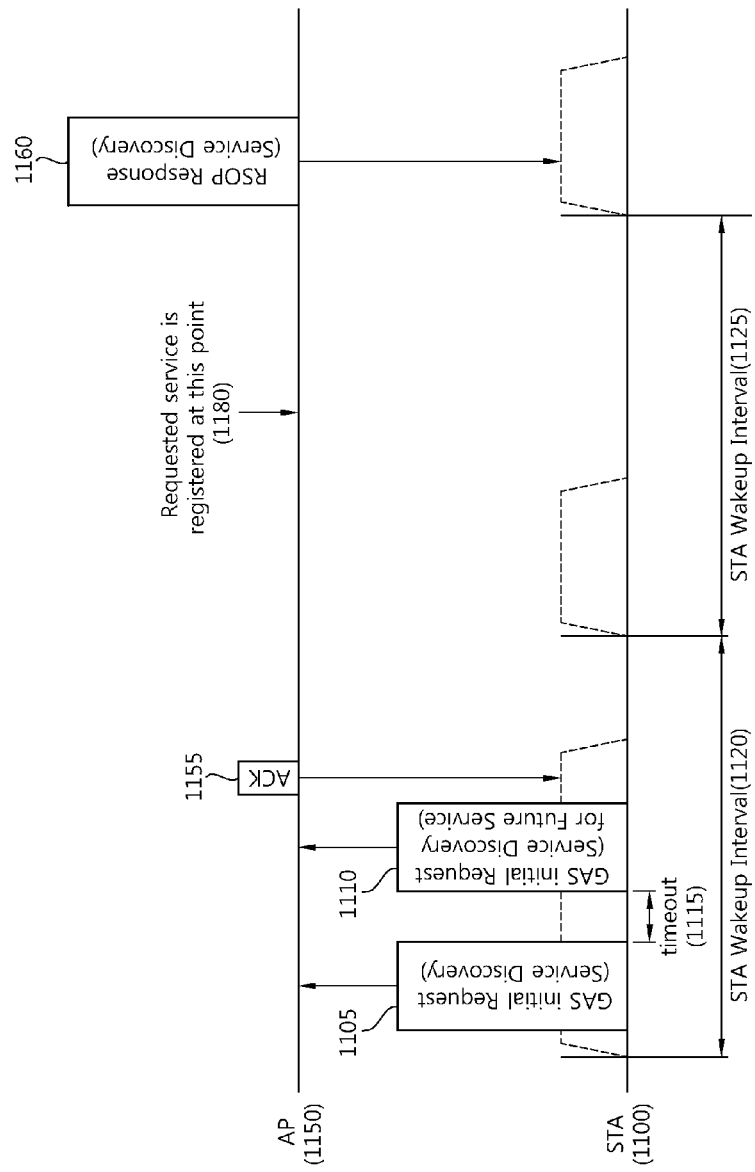
FIG. 11 shows the concept of a service discovery method of an STA by using a GAS protocol according to an embodiment of the present invention.

FIG. 11 shows the concept of a service discovery method of an STA by using a GAS protocol according to an embodiment of the present invention.

Referring to FIG. 11, first, an STA 1100 may broadcast a GAS initial request frame 1105 to an AP 1050. As a method of transmitting the GAS initial request frame 1105, the STA 1100 may use not a broadcast transmission method but a unicast transmission method.

In a query request of the GAS initial request frame 1105, information on a requested service may be included in a service discovery information field.

If a service requested by the query request of the GAS initial request frame 1105 is registered in the AP 1150, information related to the service may be transmitted by being included in the GAS initial response frame.

If the service requested by the STA 1100 is not registered in the AP 1150, there may be no response from the AP 1150.

If there is no response from the AP 1150, after a duration of a specific timeout 1115, the STA 1100 may broadcast a GAS initial request frame 1110 to request the AP 1150 to announce the registration if the requested service is registered at a later time. To request this, the aforementioned service discovery for future service field may be included in the query request of the GAS initial request frame 1105 transmitted from the STA 1100.

According to another embodiment of the present invention, as described above with reference to FIG. 7, the STA 1100 may first use a method of transmitting to the AP 1150 the GAS initial request frame 1110 including the service discovery for further service information field included in the query request.

If there is no response from the AP 1150, the STA 1100 may transmit the GAS initial request frame 1110 to request the AP 1150 after the duration of the specific timeout 1115, and may operate in a power saving mode by changing an operation mode to a sleep mode and a wakeup mode according to an STA wakeup interval of a service discovery for future service field included in the query request of the GAS initial request frame 1110

In addition, the STA may wait for service discovery result information from the AP 1150 until a determined time is elapsed according to a service query timeout of the service discovery for future service information field.

Upon receiving the GAS initial request frame 1110 including the service discovery for future service from the STA 1100, the AP 1150 transmits an ACK 1155 or the GAS initial response frame including the service discovery for further service. Therefore, if a service is discovered before a service query timeout, information indicating that service discovery result information will be transmitted to the STA 1100 may be delivered to the STA 1100.

If the GAS initial response frame 1160 is not received from the AP 1150 within a duration of a service query timeout, the STA 1100 may end the service discovery procedure.

If the service requested by the STA 1100 is registered in the AP 1150 within the duration of the service query timeout (as indicated by a reference numeral 1180 in the figure), on the basis of wakeup interval information and service query timeout information of the GAS initial request frame 1110 transmitted from the STA 1100, the AP 1150 may transmit to the STA 1100 a GAS initial response frame 1160 including service discovery result information in a wakeup duration of the STA 1100 before the service query timeout is elapsed.

Figure 12:
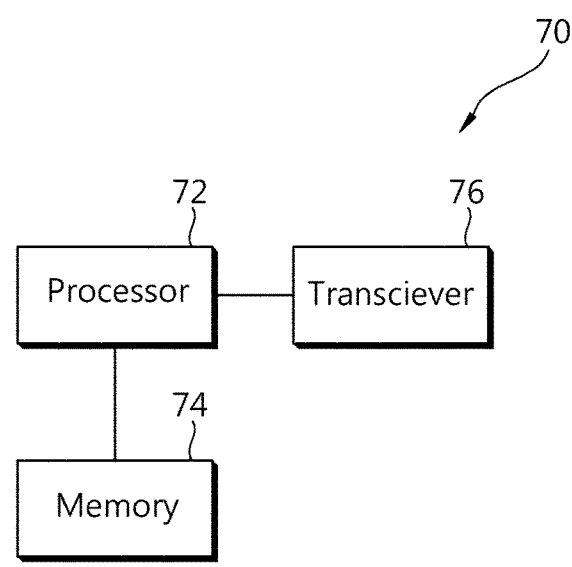
FIG. 12 is a block diagram showing a wireless device according to an embodiment of the present invention.

FIG. 12 is a block diagram showing a wireless device according to an embodiment of the present invention.

A wireless device 70 is a terminal capable of implementing the aforementioned embodiment, and may be an AP or a non-AP station.

The wireless device 70 includes a processor 72, a memory 74, and a transceiver 76. The transceiver 76 transmits and/or receives a radio signal, and implements an IEEE 802.11 PHY layer. The processor 72 is operationally coupled to the transceiver 76, and implements IEEE 802.11 MAC and PHY layers. The processor 72 may generate a frame for performing the aforementioned service discovery. For example, the processor 72 may generate a first generic advertisement service (GAS) initial request frame including a service discovery information field and may transmit it to an access point (AP). In addition, if no response is received during a specific time from the AP after transmitting the GAS initial request frame, the processor 72 may generate a second GAS initial request frame including a service discovery for further service information field and may transmit it to the AP. In addition to these operations, a process of performing operations for implementing the aforementioned embodiment of the present invention may be performed.

The processors 72 and/or the transceiver 76 may include an application-specific integrated circuit (ASIC), a separate chipset, a logic circuit, and/or a data processing unit. The memory 74 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 74 may be performed by the processor 72. The memory 74 may be located inside or outside the processor 72, and may be coupled to the processor 72 by using various well-known means.

What is claimed is:

1. A method for discovering a service in a wireless communication system, the method comprising:
   receiving, by a responding device, from a requesting device, a service request frame, the service request frame including a first service identifier indicating a service queried by the requesting device;
   starting, by the responding device, a service query timer upon receiving the service request frame;
   transmitting, by the responding device, to the requesting device while the service query timer is running, a service response frame to indicate that the queried service is supported but is currently not available and that the requesting station should wait to receive a final determination via a subsequent service announce frame, the service response frame including a second service identifier that is set to a same value in the first service identifier; and
   when the responding device determines that the queried service is accepted while the service query timer is still running, stopping the service query timer and transmitting, by the responding device, to the requesting device, the subsequent service announce frame to indicate only that the queried service is accepted or not,
   wherein the subsequent service announce frame includes a third service identifier that is set to a same value in the first service identifier, and
   wherein the subsequent service announce frame is not transmitted by the responding device if the queried service is not accepted or the service query timer is expired.

2. The method of claim 1, wherein the subsequent service announce frame includes a status code indicating whether the queried service is accepted or not.

3. The method of claim 1, further comprising:
   receiving, by the responding device, from the requesting device, a probe request frame; and
   transmitting, by the responding device, to the requesting device, a probe response frame as a response to the probe request frame before receiving the service request frame.

4. A device configured for discovering a service in a wireless communication system, the device comprising:
   a transceiver configured to receive and transmit radio signals; and
   a processor operatively coupled with the transceiver and configured to:
   receive, via the transceiver, from a requesting device, a service request frame, the service request frame including a first service identifier indicating a service queried by the requesting device;
   start a service query timer upon receiving the service request frame;
   transmit, via the transceiver while the service query timer is running, to the requesting device, a service response frame to indicate that the queried service is supported but is currently not available and that the requesting station should wait to receive a final determination via a subsequent service announce frame, the service response frame including a second service identifier that is set to a same value in the first service identifier; and
   when the device determines that the queried service is accepted or not while the service query timer is running, stop the service query timer and transmit, via the transceiver, to the requesting device, the subsequent service announce frame to indicate only that the queried service is accepted or not,
   wherein the subsequent service announce frame includes a third service identifier that is set to a same value in the first service identifier, and
   wherein the subsequent service announce frame is not transmitted by the responding device if the queried service is not accepted or the service query timer is expired.

5. The device of claim 4, wherein the subsequent service announce frame includes a status code indicating whether the queried service is accepted or not.

6. The device of claim 4, wherein the processor is further configured to:
   receive, from the requesting device, a probe request frame; and
   transmit, to the requesting device, a probe response frame as a response to the probe request frame before receiving the service request frame.

* * * * *